United States Patent Office 3,489,393
Patented Jan. 13, 1970

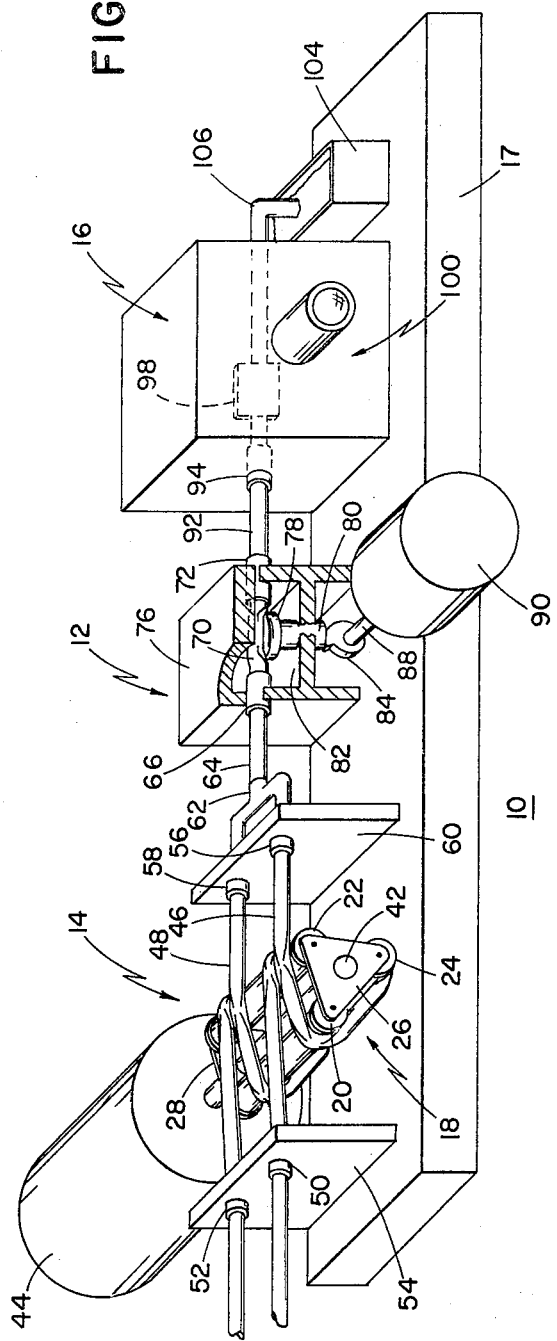

3,489,393
FLUID MIXING SYSTEM
Anthony Joseph Waraksa, Burlington, Mass., assignor to Instrumentation Laboratory, Inc., Watertown, Mass., a corporation of Massachusetts
Filed Mar. 31, 1967, Ser. No. 627,371
Int. Cl. B01f 3/08, 15/04
U.S. Cl. 259—2
13 Claims

ABSTRACT OF THE DISCLOSURE

A system for mixing two fluids includes a positive displacement pump having a triangular rotor structure about which are wrapped two flexible input lines. The input lines are joined together into a common resilient line for transfer of the combined fluids to a cuvette. A tube collapsing piston acts against a fixed backup member to repetitively collapse the tube at a rate of 12 times per second. The fluid flow rate through the transfer line is about 100 microliters per second and each time the tube is collapsed about 20 microliters of fluid is displaced, superimposing on the system flow rate countercurrent transient flow components at a fluid displacement rate about two and one-half times that of the system flow rate to produce thorough mixing in a common line length of 5½ inches.

SUMMARY OF INVENTION

This invention relates to fluid mixing systems and more particularly to the systems for mixing thoroughly two liquids.

In the analysis of many materials it is desired or essential to insure thorough mixing, for example, in a system for analyzing the hemoglobin content of blood in which the blood is diluted with a hemolyzing agent. In such systems, in addition to the requisite thorough mixing, it is desired to minimize the volumetric capacity of the mixing device. Also the mixing device should be arranged to minimize contamination and should be easy to clean or to change structures to accommodate mixing of different materials or different proportions.

According, it is an object of this invention to provide a novel and improved fluid mixing system.

Still another object of the invention is to provide a simple and inexpensive fluid mixing system particularly adapted for use with liquids where a high degree of cleanliness (lack of contamination) is essential.

Another object of the invention is to provide a novel and improved fluid mixing system particularly adapted for use with analysis of small quantities of liquids such as human blood.

Another object of the invention is to provide a novel and improved fluid mixing system which thoroughly mixes accurate proportions of selected constituents.

Still another object of the invention is to provide a novel and improved fluid mixing system which requires only a small amount of fluid to flush the system in a cleaning operation.

In accordance with the invention a fluid mixing system is provided which includes an input line, an output line, and a structure for establishing a predetermined system flow condition through the input and output lines. A flexible conduit section is interposed between the input and output lines and operating on that flexible conduit is structure for repetitively compressing that flexible conduit to superimpose on the system flow condition a transient flow condition producing velocity components superimposed on the system flow of at least about two times the system flow.

In a particular embodiment of the invention the predetermined system flow rate is established by a positive displacement pump which is driven at constant speed and acts on two input lines that are connected together at a junction so that the joint output of the two input lines is applied to the flexible conduit section. The repetitive compressing structure includes a movable member which acts against a backup member to compress repetitively the flexible conduit and block substantially all flow through the conduit twelve times each second. This compressing action produces transient velocity components that extend in the fluid through the flexible line in either direction from the piston structure in a manner to produce thorough mixing of the fluids over a relatively short conduit length (for example a distance of 5¼ inches) from the junction to the utilization device (e.g. a cuvette). In this system, at a pumping rate of one hundred microliters per second, variations in color intensity of the mixed components as seen in the cuvette are less than ±0.5%, which implies mixing of at least 99.5% which mixing may be improved by increasing the fluid residence time in the system. Also, where a change of fluids is desired, complete flushing is obtained with about one-half milliliter of fluid.

The invention provides an integrated flowing fluid mixing system which provides thorough mixing over a relatively short length in a simple, inexpensive and reliable structural arrangement which introduces no contamination into the fluid system. The system is easy to clean or to change components for use with other proportions or other mixtures. It is particularly suited for mixing small quantities of precious fluids such as human blood for analysis purposes and enables rapid analysis of a series of different samples with minimal amounts of flushing while avoiding contamination between samples.

Other objects, features and advantages of the invention will be seen as the following description of a particular embodiment thereof progresses, in conjunction with the drawings, in which:

FIG. 1 is an axonometric diagrammatic view of a hemoglobinometer system constructed in accordance with the invention;

FIG. 2 is a sectional diagrammatic view of the conduit compressing structure employed in the apparatus shown in FIG. 1; and FIG. 3 is an axonometric diagrammatic view of another form of conduit compressing structure suitable for use in the invention.

There is shown in FIG. 1 a hemoglobinometer system 10 for aspirating a sample of whole blood and mixing it with a hemolyzing agent. The resulting mixture is passed through a cuvette for colorometric analysis at a single wavelength of light and the information obtained is useful for indicating the hemoglobin concentration in the blood sample.

The system includes a fluid mixing structure 12 interposed between a positive displacement pump 14 and an analysis unit 16; mixing structure 12, pump 14 and analysis unit 16 being positioned in fixed locations relative to one another by suitable means such as base 17.

Positive displacement pump unit 14 includes a rotor unit 18 having three roller elements 20, 22 and 24 which are supported on triangular frame members 26 and 28 which in turn are mounted on shaft 42 that is driven in rotation by motor 44. A blood supply line 46 and a dilutant fluid line 48 are each wrapped in a single helical turn about rotor unit 18 and are appropriately secured against movement as by bushing clamps 50 and 52 in wall 54 at their input ends and by bushing clamps 56 and 58 in wall 60 at their output ends so that a sealing constriction is provided in each tube at three points, at each point of contact of each tube with a roller 20, 22 and 24. Blood supply line has an inner diameter of 0.015 inch and an outer diameter of 5/32 while dilutant line 48 has an inner diameter of 0.050 inch and an outer diameter of 5/32 inch. The common rotor unit produces flow rates at a fixed ratio proportional to the ratio of the squares of the inner diameters of these lines, a typical value being a blood intake rate of 6–8 microliters per second and a dilutant rate of 80–100 microliters per second.

Lines 46 and 48 are joined together at a junction T62 and connected to an input transfer line 64 2½ inches in length which has an inner diameter of 0.015 inch and an outer diameter of ⅛ inch. Connected to transfer line 64 by coupling 66 is a mixing line 70 1¾ inches in length which has an outer diameter of ⅛ inch and an inner diameter of 0.08 inch. An output transfer line section 92 is connected between coupling 72 and coupling 94 in analysis unit 16. Line section 92 has a length of 1 inch, an outer diameter of ⅛ inch and an inner diameter of 0.05 inch, thus providing flow restrictions on either side of mixing unit 12. Input transfer line 64 has a volume of approximately 7 microliters, mixing line 70 has a volume of approximately 200 microliters and output transfer line has a volume of approximately 25 microliters. The fluid transfer line may be flexible resilient high tensile silicone tubing of about 50 durometer. A particularly suitable tubing for both the fluid transfer line and the pump lines is available from Holter Products under the designation Meditube Type 372.

Acting on the mixing line section 70 is a mixer structure which includes a backup plate 76 and a piston 78 having an effective surface length of 0.5 inch. Extending downwardly from piston 78 is cylindrical guide arm 80 which is received in guide bearing 82 and is engaged by cam 84 for repetitive reciprocation to fully compress tube 70 once each rotation of cam shaft 88 as that cam is driven by motor 90.

The analysis unit 16 includes a cuvette structure 98 having a volume of approximately 50 microliters in which the fluid is analyzed by a colorimeter apparatus diagrammatically indicated at 100. From the cuvette 98 a mixture is discharged to sump 104 through line 106.

In operation, lines 46 and 48 are connected to sources of blood and dilutant fluid respectively. As rotor unit 18 is driven the fluids in lines 46, 48 are pumped in the preestablished ratio to the mixing junction 62 by the positive displacement pump and are combined for flow through the mixing conduit line sections 64, 70 and 92. This fluid flow rate is approximately 100 microliters per second. At the mixing unit 12 this fluid flow is subjected to transient repeated displacements of approximately 20 microliters each at a rate of 12 compressions per second. This compression produces abrupt velocity changes in fluid flow sufficient to cause a degree of flow of the blood into the dilutant channel connected to junction 62 (which flow is visible through the translucent tubing) and radial as well as axial displacement of the fluid mixture, resulting in a uniform rapid mixing of the blood and dilutant hemolyzing liquid so that high quality colorimetric analysis is made possible at a distance of only one inch from the mixing unit 12 to the cuvette. The resiliency of the line and fluid pressure returns the line to its cylindrical configuration and the piston 78 is returned in each cycle by suitable means, either gravity or in a biasing member. Mixing is 99.5% and may be improved further by increasing the actuation rate of piston 78. Complete flushing is accomplished with less than one milliliter of waste fluid in five to ten seconds.

A second form of mixing structure is illustrated in FIG. 3. That structure includes a pair of arms 112, 114 which are joined together by a resilient connection 116. Contact pads 118, 120 are mounted on arms 112, 114 respectively and an electrical magnet 122 is energized to move the pads 118, 120 between open and compressing positions for repetitively imparting a compressing force on line 70'. In a particular embodiment of this form of mixing unit a vibration rate 120 cycles per second has been utilized with a pair of pads 118 and 120 (0.5 inch in diameter) to produce a displacement of approximately 10 microliters each cycle. In this and in other forms of the apparatus a transfer line 70' having input, mixing and output sections of the same inner diameter may be employed.

In a bilirubinometer constructed in accordance with the invention (a device in which a chemical change in blood serum or plasma is produced by a dilutant fluid and the relative absorbance of the mixture at different wavelengths is monitored) a sample line 46 having an inner diameter of 0.01 inch (producing an intake rate of about 3 microliters per second) is substituted for line 46; while in an oximeter (in which whole blood, thoroughly mixed with a hemolyzing fluid, is passed through colorimeter where this absorption is monitored at two different wavelengths) employs a single transfer line of inner diameter of 0.0625 inch having a total length of two inches and including sections 64, 70 and 92. These two apparatuses employ the fluid displacement device shown in FIG. 3 and described above.

It will be seen that the invention provides a compact, simple reliable fluid mixing system. The system may be easily cleaned, either by flow of cleaning fluid through the system or by replacement of conduit components. No mixing structure is disposed in direct contact with the fluid. Mixing is accomplished rapidly and thoroughly and in precise ratio. While particular embodiments of the invention have been shown and described, various modifications thereof will be apparent to those skilled in the art and therefore it is not intended that the invention be limited to the disclosed embodiments or to the details thereof and departures may be made therefrom within the spirit and scope of the invention as defined in the claims.

What is claimed is:
1. A mixing system comprising an input line portion, an output line portion,
a flexible conduit portion interposed between said input and output line portions, said input line, output line and flexible conduit portions being a single tubular member having the same cross-sectional configuration throughout said portions,
structure establishing a predetermined system flow condition through said input and output line portions, and
structure for repetitively compressing said flexible conduit portion to superimpose on said system flow condition a transient flow condition having a velocity component superimposed on said system flow of at least about two times said system flow condition.

2. The system as claimed in claim 1 wherein said system flow condition is produced by a positive displacement pump.

3. The system as claimed in claim 1 wherein said input line, output line and flexible conduit portions are of a single tubing member having the same cross sectional configuration throughout said portions.

4. The system as claimed in claim 1 wherein said flexible conduit portion has a durometer value of about fifty.

5. A mixing system comprising an input line portion, an output line portion,
a flexible conduit portion interposed between said input and output line portions,
structure establishing a predetermined system flow condition through said input and output line portions, and
structure for repetitively compressing said flexible conduit portion to superimpose on said system flow condition a transient flow condition having a velocity component superimposed on said system flow of at least about two times said system flow condition,
said repetitive compressing structure including a compressing surface of length greater than the largest cross sectional inner dimension of said flexible tubing portion and means for moving said compressing surface to cause said surface to compress said flexible conduit portion and block substantially all flow through said flexible conduit portion during each compressing action.

6. The system as claimed in claim 5 wherein said compressing surface length is at least about five times the inner diameter of said flexible tubing portion.

7. A mixing system comprising an input line portion, an output line portion,
a flexible conduit portion interposed between said input and output line portions,
structure establishing a predetermined system flow condition through said input and output line portions, and
structure for repetitively compressing said flexible conduit portion to superimposed on said system flow condition a transient flow condition having a velocity component superimposed on said system flow of at least about two times said system flow condition,
said repetitive compressing structure including a compressing surface of length substantially greater than the largest cross sectional inner dimension of said flexible tubing portion and a fixed backup member against which said compressing surface acts to block substantially flow through said flexible conduit portion during each compressing action.

8. A mixing system comprising an input line portion, an output line portion,
a flexible conduit portion interposed between said input and output line portions,
structure establishing a predetermined system flow condition through said input and output line portions, and
structure, including a cam actuator, for repetitively compressing said flexible conduit portion to superimpose on said system flow condition a transient flow condition having a velocity component superimposed on said system flow of at least about two times said system flow condition.

9. A mixing system comprising an input line portion, an output line portion,
a flexible conduit portion interposed between said input and output line portions
structure establishing a predetermined system flow condition through said input and output line portions, and
structure, including an electromagnetic actuator, for repetitively compressing said flexible conduit portion to superimpose on said system flow condition a transient flow condition having a velocity component superimposed on said system flow of at least about two times said system flow condition.

10. A mixing system for mixing a precious fluid for analysis purposes comprising an input line portion,
two fluid supply lines for jointly supplying fluid to said input line portion,
positive displacement pump apparatus, including a pump drive, for acting on both said supply lines to provide a fluid mixture of established fluid ratio and constant system flow rate,
an output line portion,
a flexible conduit portion of about 50 durometer value interposed between said input and output line portions,
said input line, flexible conduit and output line portions having a volume of less than one milliliter, and
structure for repetitively compressing said flexible conduit portion to superimpose on said constant system flow rate a transient flow condition having a velocity component at least about two times said system flow condition,
said repetitive compressing structure including a compressing surface of length substantially greater than the largest cross sectional inner dimension of said flexible tubing portion and a fixed backup member against which said compressing surface acts to block substantially flow to said flexible conduit portion during each compressing action.

11. A mixing system comprising an input line portion, an output line portion,
a flexible conduit portion interposed between said input and output line portions,
structure establishing a predetermined system flow condition through said input and output line portions, and
structure, including an electromagnetic actuator, for repetitively compressing said flexible conduit portion without blocking flow therethrough to superimpose on said system flow condition a transient flow condition having a velocity component superimposed on said system flow of at least about two times said system flow condition.

12. A mixing system comprising an input line portion, two fluid supply lines for jointly supplying fluid to said input line portion,
positive displacement pump apparatus, including a pump drive, for acting on both said supply lines to provide a fluid mixture of established fluid ratio and constant system flow rate,
an output line portion,
a flexible conduit portion of about fifty durometer value interposed between said input and output line portions,
said input line, flexible conduit and output line portions having a volume of less than one milliliter, and
structure for repetitively compressing said flexible conduit portion to superimpose on said constant system flow rate a transient flow condition having a velocity component at least about two times said system flow condition,
said repetitive compressing structure including a compressing surface of length substantially greater than the largest cross sectional inner dimension of said flexible tubing portion.

13. A mixing system comprising an input line portion, an output line portion,
a flexible conduit portion interposed between said input and output line portions,
structure establishing a predetermined system flow condition through said input and output line portions, and
structure for repetitively compressing said flexible conduit portion without blocking flow therethrough to superimpose on said system flow condition a transient flow condition having a velocity component superimposed on said system flow of at least about two times said system flow condition.

References Cited

UNITED STATES PATENTS

| | | | |
|---|---|---|---|
| 2,999,673 | 9/1961 | Kessler | 259—7 |
| 3,012,701 | 12/1961 | Weber | 251—7 |
| 3,143,124 | 8/1964 | Todd | 137—13 |
| 3,250,130 | 5/1966 | Lozano | 251—7 X |

ROBERT W. JENKINS, Primary Examiner

U.S. Cl. X.R.

259—95